Aug. 12, 1924.

O. E. BARTHEL

PISTON

Filed April 10, 1922

1,504,538

Inventor
Oliver E. Barthel,
By
Attorneys

Patented Aug. 12, 1924.

1,504,538

UNITED STATES PATENT OFFICE.

OLIVER E. BARTHEL, OF DETROIT, MICHIGAN.

PISTON.

Application filed April 10, 1922. Serial No. 551,004.

*To all whom it may concern:*

Be it known that I, OLIVER E. BARTHEL, a citizen of the United States of America, residing at Detroit, in the county of Wayne and State of Michigan, have invented certain new and useful Improvements in Pistons, of which the following is a specification, reference being had therein to the accompanying drawings.

In ammonia and air compressing apparatus it is essential that the pistons which compress ammonia or air be non-leakable relative to cylinder walls and capable of producing a high degree of compression. To obtain such compression various kinds of packing rings have been devised, but it is only a matter of time until such packing rings become useless and allow gas or air to escape past the pistons and decrease the efficiency of a compressor or pump. It is also necessary that the pistons do not increase the volumetric compression area of a compressor or pump by any packing devices carried by the pistons and the best results are attained when flat ended pistons are employed, which permits of reducing the clearance volume to a minimum.

My invention aims to provide a flat ended piston which will have positive and reliable packing qualifications to prevent the passage of lubricant, air, gas, liquid or any other fluid or substance from one end of the piston to the opposite end thereof, and at the same time prevent scoring or piston injury of the cylinder walls against which the piston reciprocates.

My invention further aims to provide piston bodies with feather edges that will cooperate with flat heads or end members in forming annular grooves in which may collect a lubricant and insure an easy reciprocation of the piston in a cylinder. The feather edge may be carried by a detachable member or be integral with a head or end member and in some instances a skirt may be associated with the piston body, head or end member.

My invention further aims to accomplish the above and other results by various forms of pistons falling within the scope of this invention and these pistons will be hereinafter specifically described and then claimed.

Reference will now be had to the drawing, wherein

Figures 3, 4:
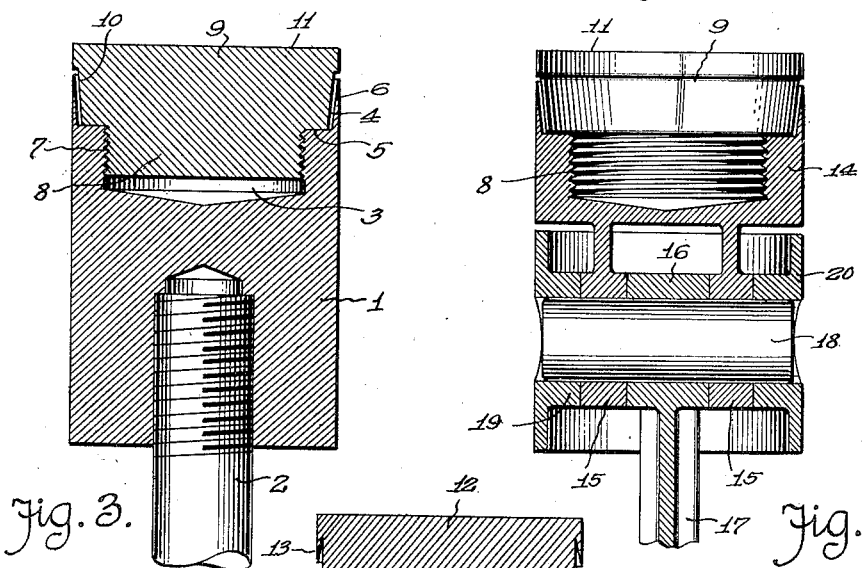
Fig. 3 is a longitudinal sectional view of the piston body in accordance with my invention.
Fig. 4 is a similar view of a piston body provided with a skirt.
Figure 5:
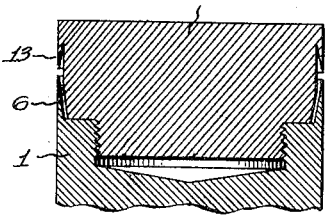
Fig. 5 is a detail sectional view of a portion of another form of piston.

Considering a simple form of the piston, such as may be used in the compressor of the refrigeratory apparatus, reference will first be had to Figs. 3 and 5 showing a cylindrical piston body 1 which has a rigid piston rod 2 such as would be connected to a slide head reciprocated from a crank shaft. The outer end of the piston body 1 is provided with stepped inner and outer recesses 3 and 4 respectively, said recesses providing an annular shoulder 5 adjacent a thin feather edge annular wall 6 of the recess 4, and the annular wall of the recess 3 is screwthreaded, as at 7.

Screwed into the recess 3 is the exteriorly screwthreaded stem 8 of an end piece or head 9 adapted to seat on the shoulder 5, said head having an annular tapered wall 10 confronting the wall 6 of the recess 4 and cooperating therewith in providing an annular groove in the periphery of the piston, which groove is open at the feather edge of the wall 6 and under the extreme outer end of the head 9. The head 9 presents a flat end wall 11 and the wall 10 of said head is tapered inwardly from the outer end of the head to the inner end, with the taper corresponding in angularity to the taper of the wall 6, and with the exception of the annular groove the head 9 is as though integral with the piston body 1.

As shown in Fig. 5, a head or end member 12 of greater depth is used so that the outer end of the head may be undercut to provide an annular feather edge tapering wall 13 in opposed relation to the wall 6 of the piston body 1 and in this form the piston as an entirety will possess two annular feather edges and practically two annular grooves which cooperate in forming an annular pocket in the wall of the piston. This annular pocket may receive lubricant, gas or other matter and as crowded therein the feather edges will be caused to expand or distend against the walls of the cylinder and seal the piston relative to the cylinder walls during its reciprocation against such cylinder walls.

In Fig. 4 the end member or head 9 is carried by comparatively short piston body 14 and the inner end of this body has parallel apertured arms 15 between which may be placed a head 16 of a connecting rod 17. Extending through the arms 15 and the head 16 is a piston pin 18 having its ends in inwardly projecting apertured bosses or bearings 19 carried by a sleeve or skirt 20 which has its outer end in spaced relation to the inner end of the piston body 14. This skirt is self adjusting and constitutes a guide in a cylinder for the piston body 14 and the advantages of the self adjusting skirt have been brought out in my Patent No. 1,139,396, granted May 11, 1915.

Figures 1, 2:
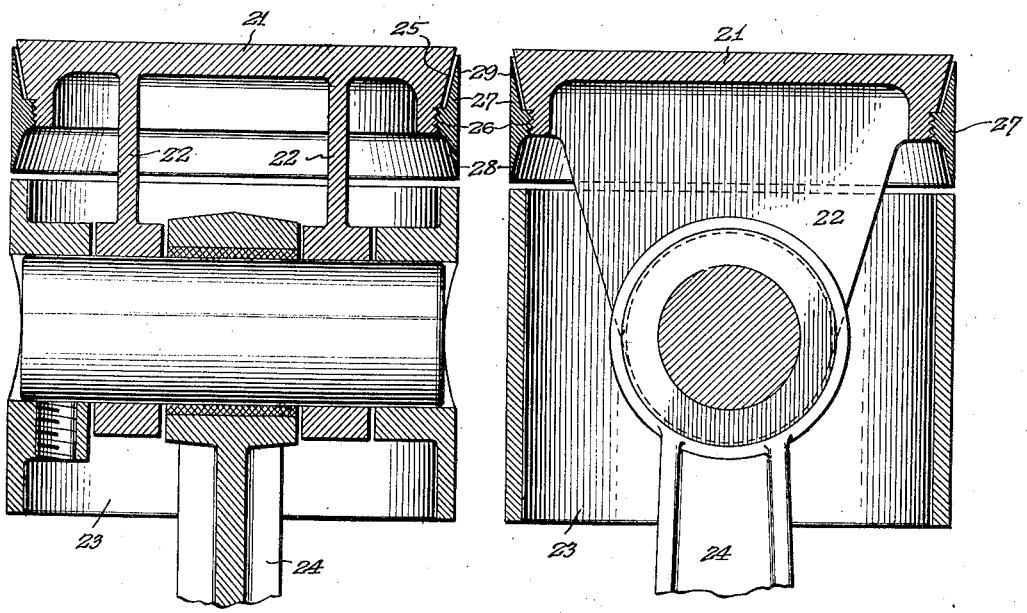
Figure 1 is a longitudinal transverse sectional view of a piston having a skirt.
Fig. 2 is a longitudinal cross sectional view of the same.

As further illustrating the use of a self adjusting skirt in connection with my present improvement, there is illustrated in Figs. 1 and 2 an end member or head 21 having arms 22 operatively held relative to a skirt 23 and a connecting rod 24. The head 21 is formed with an inwardly tapering wall 25 and a screwthreaded portion 26. On the screwthreaded portion 26 is screwed a ring or band 27 having inner and outer feather edge tapering walls 28 and 29. The inner wall 28 confronts the outer end of the skirt 23 and the outer wall 29 confronts the tapered wall 25 of the head 21 to cooperate therewith in providing an annular groove like that shown in Figs. 3 and 4 and the inner wall 28 may cooperate with the outer end of the skirt 23 in forming another annular groove or space for the dissemination of heat and freedom of action when expanded or distended against the walls of the cylinder.

In all forms of my invention the piston possesses the feather edge and the flat end wall, both of which are essential in a compressor so that there may be a full piston stroke, high compression, and practically no leakage past the piston. Such pistons have been tested and found satisfactory, and I would have it understood that either form may be used in a compressor or for other purposes.

What I claim is:—

1. A piston comprising a body having an annular feather edge, and a detachable end member connected to said body and cooperating therewith in forming an annular recess.

2. A piston as called for in claim 1, wherein said end member has a flat end wall.

3. A piston comprising a body having an annular wall terminating in a feather edge, and an end member fastened to the piston body and surrounded in part by the wall of said body to form an annular open recess.

4. A piston as called for in claim 3, wherein said end member has a tapered wall cooperating with the wall of said body in forming the recess which is directed inwardly towards the axis of said body.

5. A piston comprising a body having an annular wall terminating in a feather edge, and an end member carried by said piston body and overhanging the feather edge of said body.

6. A piston as in claim 5, wherein the side wall of the end member is co-extensive of the wall of said piston body.

7. A piston comprising a body having an axial recess therein with a wall of said recess terminating in a feather edge, and an end member having a stem screwed into the recess of said body to confront the feather edge wall of said recess and provide an annular recess which is directed inwardly towards the axis of said body.

In testimony whereof I affix my signature in presence of two witnesses.

OLIVER E. BARTHEL.

Witnesses:
ANNA M. DORR,
KARL H. BUTLER.